United States Patent [19]

Suddeth

[11] Patent Number: 5,058,758

[45] Date of Patent: Oct. 22, 1991

[54] COMPRESSED GAS CYLINDER VALVE AND GAUGE PROTECTOR

[76] Inventor: Bucky D. Suddeth, 1318 St. Pauls Church Rd., Salisbury, N.C. 28146

[21] Appl. No.: 637,670

[22] Filed: Jan. 7, 1991

[51] Int. Cl.$^5$ .............................................. F16K 35/00
[52] U.S. Cl. .................................. 220/85 P; 137/382; 220/664
[58] Field of Search .............. 220/85 P, 664; 137/382, 137/383

[56] References Cited

U.S. PATENT DOCUMENTS

| | | | |
|---|---|---|---|
| 4,103,806 | 8/1978 | White | 220/85 P |
| 4,352,370 | 10/1982 | Childress | 220/85 P |
| 4,600,033 | 7/1986 | Baron | 220/85 P |
| 4,880,134 | 11/1989 | Wood, Jr. | 220/85 P |
| 4,884,708 | 12/1989 | Langz et al. | 220/85 P |
| 4,944,424 | 7/1990 | Wood, Jr. | 220/85 P |
| 4,955,404 | 9/1990 | Pitzen | 220/85 P |

FOREIGN PATENT DOCUMENTS 403775  1/1934  United Kingdom .............. 220/85 P

Primary Examiner—Joseph Man-Fu Moy
Attorney, Agent, or Firm—Donald L. Weinhold

[57] ABSTRACT

A removeable protective cover for attachment to the valve and gauge assembly commonly used with portable compressed gas cylinders. The protector is easily attached to an existing valve, regulator and gauge assembly in basically two mating elements constructed for strength to absorb unexpected impact to the valve assembly. The protective cover is removeably attached to the gas cylinder and is placed adjustably into counter opposing contact with the valve assembly so that the force of any impact to the valve assembly area is transmitted through the protective cover, rather than into potentially damaging contact with the valve assembly. The mating halves of the protective cover are clamped around the threaded neck of the cylinder for basic support, constructed to totally enclose the valve assembly, and include contact between the cover and the valve assembly which may be adjusted by means of locking screws, while still exposing the reporting gauges through openings in the protective cover.

7 Claims, 3 Drawing Sheets

COMPRESSED GAS CYLINDER VALVE AND GAUGE PROTECTOR

BACKGROUND OF THE INVENTION

The industrial and scientific community has long recognized the value of compressed gases such as air, xenon, hydrogen, helium, oxygen, and many other elements and gas mixtures. Moreover, as utility became more integral, the value of portable systems became obvious. Pressure vessels, called portable gas cylinders, were designed to meet such need. In order to insure safety, the cylinders or bottles, have been required to meet certain design and testing standards. Within these design and testing standards, the gas cylinder itself becomes relatively safe, so long as it is inspected regularly.

Inherent in the design of the gas bottle is the addition of a valve assembly which screws into the top of the cylinder. The valve assembly becomes the weak point in the compressed gas system, both in the valve itself and the screw-type connection between the bottle and the valve. The valve system operates as a governor system to deliver the compressed gas at a useable pressure and flow rate.

The valve assembly is comprised of regulators, gauges and delivery valves.

Because cylinders are designed to be portable and are generally long cylinders in shape, they are subject to be knocked over by accident. The valve system being the weak link in the compressed gas system, such an accidental turning of the bottle could cause unexpected impacts to the valve system with the result that should the threaded junction of valve and tank or the valve assembly itself rupture or break the pressurized seal between valve and tank, the sudden escape of compressed gas could result in the release of literally tons of violent and uncontrolled force, not only making the components of the system potentially deadly missiles, but also resulting in destruction of an expensive system.

In order to help minimize the risk of accidental damage, the regulator and gauge systems are necessarily removed and replaced regularly at an expense of valuable time and effort. In addition, certain protective covers have been designed to cover the basic valve and even the valve and regulator system combination so that disassembly is not always necessary. However, these systems have not generally accomplished the goal of protecting the system against sharp impacts and/or have been more cumbersome to install than conventional disassembly and reassembly of the regulator system and application of a valve cover.

SUMMARY OF THE INVENTION

It is therefor an object of my invention to provide a protective cover assembly for a compressed gas cylinder valve and regulator assembly which is both an effective guard against accidental damage to the system and one which is easily attached to and removed from the cylinder. In furtherance of said object, the applicant's invention easily clamps onto the cylinder neck and is held in place by the screw threads in the top of cylinder neck. In addition, stationery blocks are provided on the inside surface of the cover and strategically placed so they contact the valve-regulator assembly and are releaseably secured solidly therebetween to add both strength and impact resistance to the cover assembly.

As a further object of applicant's invention, the guard is designed to protect the entire valve-regulator and gauge assembly without the necessity to break down the assembly when not being used due to activity, storage or transportation.

It is yet another object of the applicant's invention to provide a guard assembly which makes component parts and gauge faces visible and functional even while the guard is in place.

It is also an object of the applicant's invention to provide a guard which does not have to be removed in order to utilize the compressed gas cylinder.

Other objects and advantages of the present invention will become apparent to those skilled in the art after considering the following specification which discloses several embodiments including a preferred embodiment thereof in conjunction with the accompanying drawings, wherein:

DETAILED DESCRIPTION OF THE DRAWINGS

Figure 1:
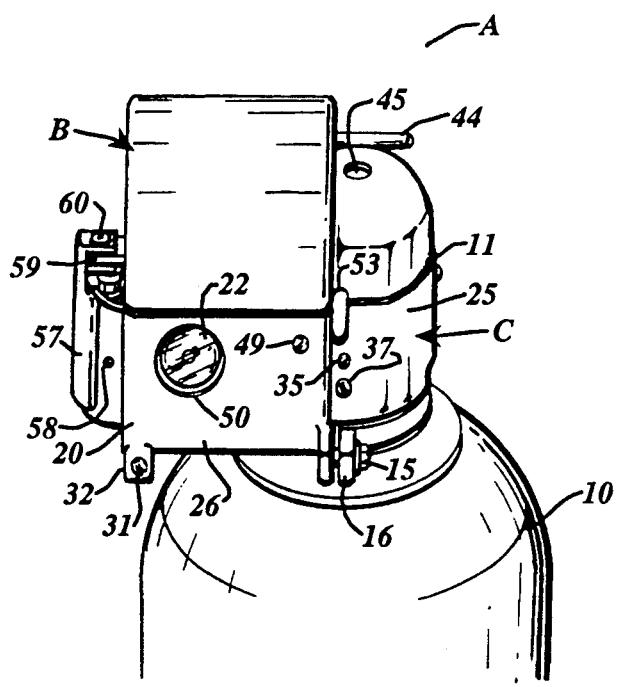
FIG. 1 is a general perspective view of the preferred embodiment attached to a compressed gas cylinder.
Figure 2:
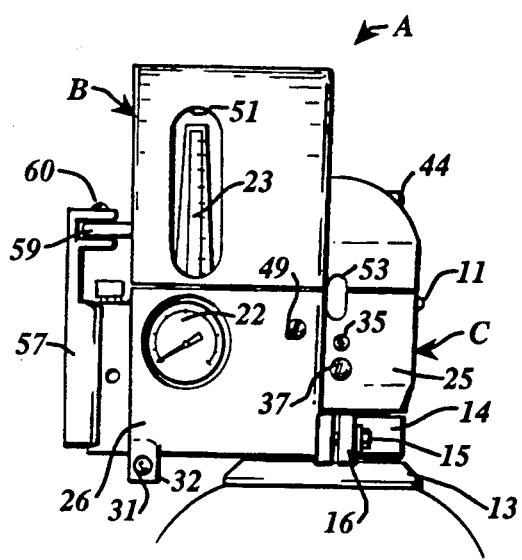
FIG. 2 is a front elevational view of the invention showing a second embodiment of the instrumentation viewing apparatus.

Referring first to the preferred embodiment shown in FIG. 1, a standard compressed gas cylinder, 10, is shown supporting a gauge protector, shown generally at A. Gauge Protector, A, is generally divided into upper half, B, and lower half, C, separated by parting line, 11, which represents the line of junction between the flanged male surface on half, B and the receptive female surface on half, C when the gauge protector is assembled.

Figure 5:
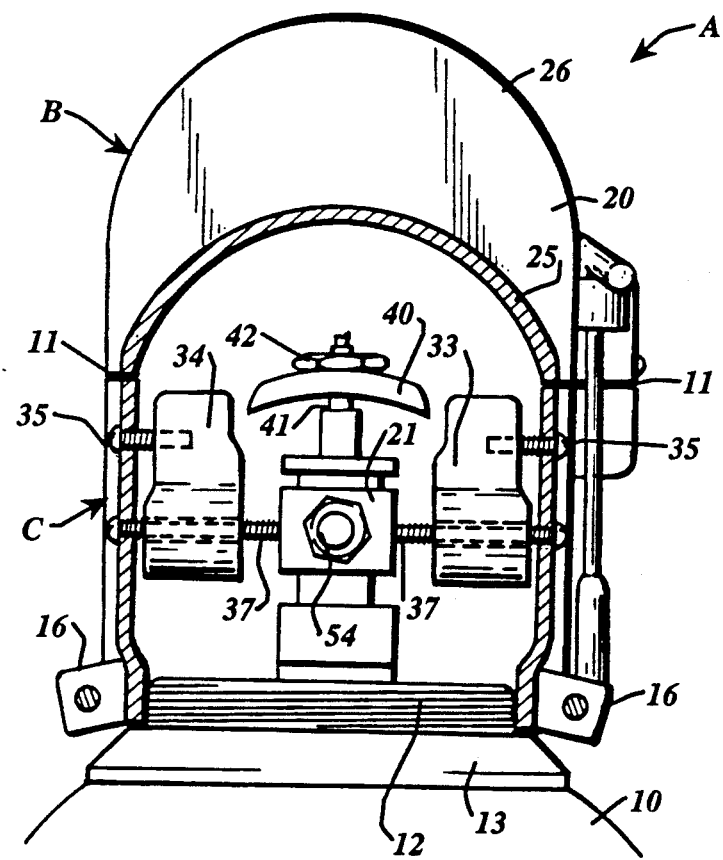
FIG. 5 is a detail cut-way sectional view of the preferred embodiment showing the interior of the protector installed on a compressed gas cylinder.
Figure 6:
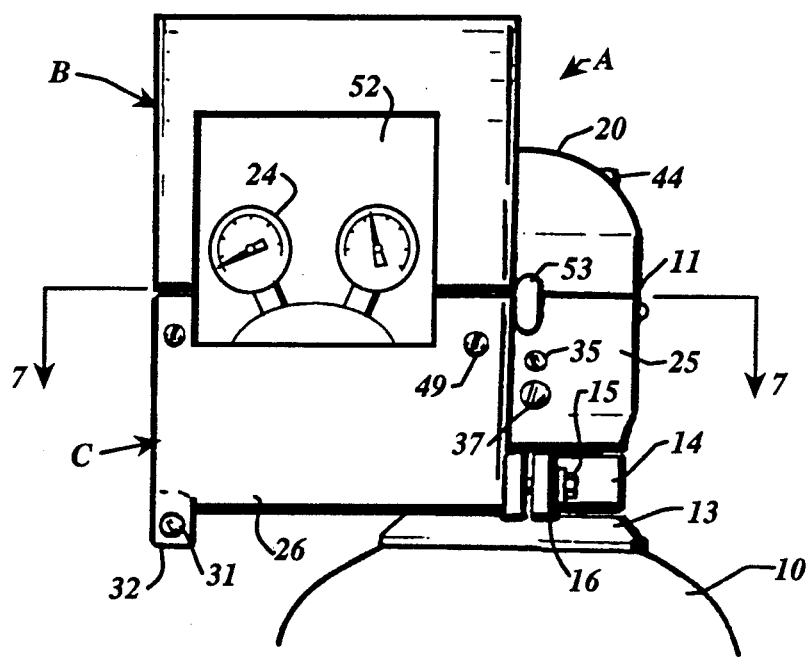
FIG. 6 is a front elevational view of the invention showing a third embodiment of the instrumentation viewing apparatus.

As shown in FIG. 5, standard cylinder, 10, is typically provided with machined screw threads, 12, surrounding the neck portion 13, of cylinder, 10. Lower half, C, is comprised of clamp, 14, the interior of which is threaded to securely attach to cylinder threads, 12, clamp, 14, is made in 2 segments which are releaseably secured to each other and in turn to cylinder, 10, by means of any expedient such as nut and bolt assembly, 15, passing through flanges, 16. Clamp assembly 14, 15, and 16, serve to securely hold protector A to cylinder, 10. In addition, lower half, C, includes housing, 20, which is designed to enclose cylinder valve, 21, and such gauge configuration as may accompany the cylinder-valve assembly, such as those at 22, 23, and 24. Housing 20 is comprised of a generally cylindrical cross section portion on one side shown as 25 and a generally rectangular cross section portion on the opposite side, shown as 26; cylindrical portion, 25, having the valve 21 and rectangular portion, 26, housing the gauges 22, 23, or 24. In order to add rigidity and support to housing, C, so that the housing will protect the cylinder valve, 21, and gauges 22, 23, or 24, support rod, 30, is located along bottom of housing portion, 26, through integral tab, 32, and being secured thereto by any expedient, such as screws, 31.

Figure 4:
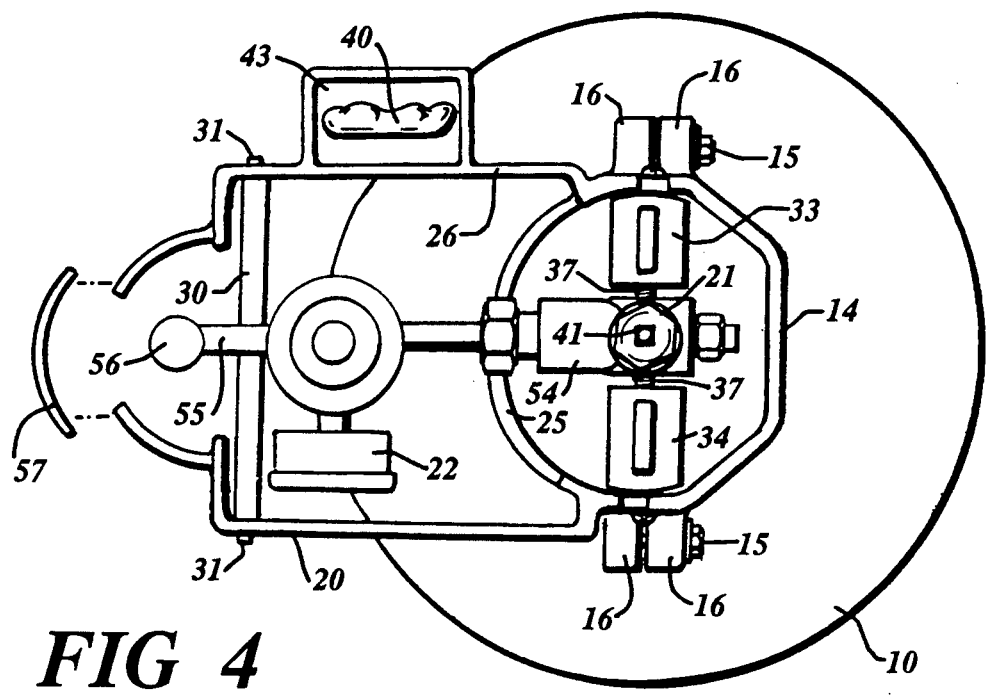
FIG. 4 is a detail planar sectional view of FIG. 3 taken along section lines 4—4.
Figure 7:
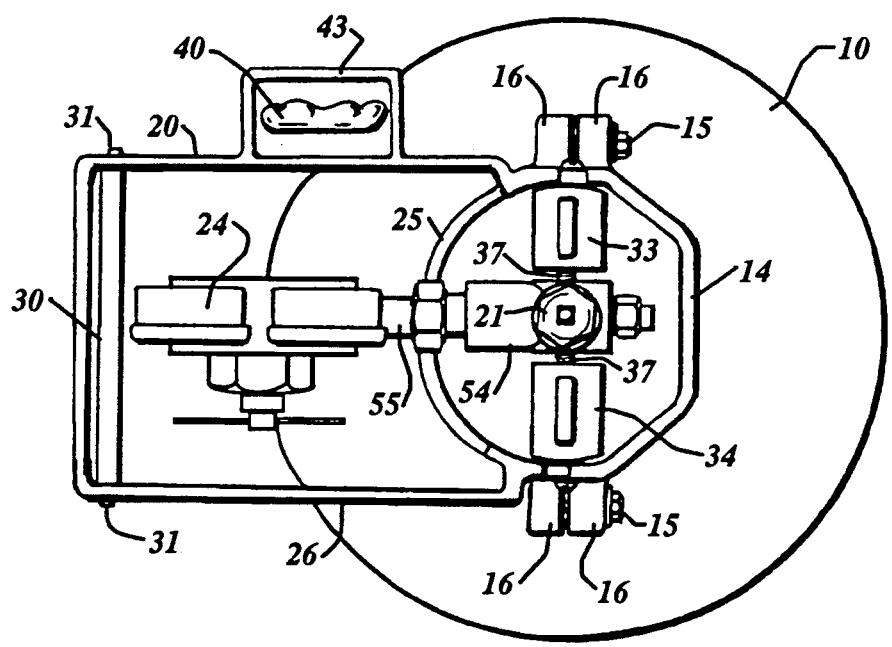
FIG. 7 is a sectional plan view of the protector installed on a compressed gas cylinder taken along sectional lines 7—7 in FIG. 6.

Located inside portion 25 are impact blocks, 33 and 34, shown in FIG. 4, 5, and 7, which are secured to housing portion 25 by means of any expedient such as screw or bolt, 35. Impact blocks, 33 and 34, are wedged between housing portion, 25, and valve, 21, in order to transmit impact pressure through impact blocks, 33 and 34, and valve, 21, so that the valve is protected. In order to securely wedge valve protector housing portion, 25, to valve, 21, adjustable screws, 37, are provided to penetrate through housing 25, and blocks, 33 and 34, into wedging registry with valve, 21.

Figure 3:
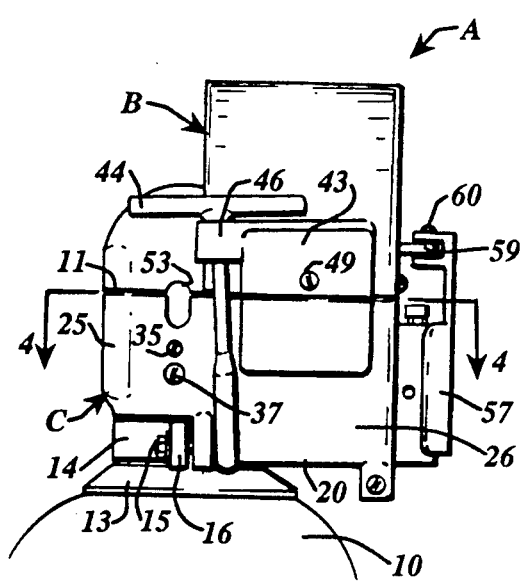
FIG. 3 is a rear elevational view of the preferred embodiment.

Valve, 21 is generally provided with standard cut on/off handle, 40, which is releaseably secured to valve stem, 41, by a screw or nut such as the wing nut shown as 42. When removed, handle, 40, may be stored in compartment 43, integrally formed in the back of the gauge housing, A. Once removed, the valve, 21, may be operated with "T" handle, 44, without removing guard A, by inserting handle, 44, through access opening, 45, in the top of cylindrical valve housing protector. While not in use, handle, 44, may be stored in sleeve, 46 integrally formed to back of guard A as shown in FIG. 3.

Guard A is also comprised of upper half, B, which is also of similar cross section to lower half, C, so that the two halves precisely mate, being releaseably, integrally held together by any convenient expedient such as screws, 49. Gauge configuration, 22, is made readable with guard A in place by means of window 50. Likewise, gauge, configurations 23 and 24 are provided with windows, 51 and 52 respectively. In like manner, the valve assembly may be inspected through opening, 53.

The cylinder valve regulator, 54, may be adjusted through stem, 55, by control knob, 56, which is made accessible through access door, 57, which is secured by any expedient such as tapped screws, 58, tab, 59, and nut and bolt assembly, 60.

It should be apparent that an improved compressed gas cylinder, valve, assembly protector has been described. While the invention has been shown in its preferred embodiments, many other modifications, changes and substitutions in detailed construction and combinations and arrangements of elements may be employed without departing from the spirit and scope of the invention.

I claim:

1. A gauge and valve protector for use with compressed gas cylinders, comprising:
   a) A rigid guard releasably attachable to the neck of a standard compressed gas cylinder and being divided into an upper half and a mating lower half, releasably secured together to form an integral unit when assembled and facilitating installation of the lower half on said cylinder neck when disassembled;
   b) Separate compartments to house and protect valve, gauge, and regulator assemblies while said assemblies remain attached to said cylinder, without the necessity to remove said assemblies;
   c) Means to releasably secure said guard to the neck of said cylinder comprising a cylindrical clamp sized to surround the said cylindrical neck;
   d) A shatter-proof, transparent window configuration located on the side of said protector and being of such configuration so as to expose such gauge configuration as may be used in order that the gauges might be read while the protector is in place; and
   e) A "T" handle with an extended stem which may be substituted for the standard valve handle and which may be utilized by extension through an aperture in the top of the valve protector, directly above the standard valve stem.

2. The protector of claim 1, wherein said clamp means is divided into mating semi-cylindrical sections which clamp around said cylinder neck and which are releasably secured to each other by a pair of nuts and bolts, one on each side of the semi-cylindrical clamp which are forced into secure registry with said cylinder neck.

3. The protector of claim 2, wherein the interior surface of said semi-cylindrical clamps are provided with threads which mate with the cylinder neck threads.

4. The protector of claim n a storage compartment for removed standard valve handle is integrally formed into said protector housing.

5. The protector of claim 1, wherein a storage sleeve for said "T" handle is integrally formed into said protector housing for use when "T" handle is not being used.

6. The protector of claim 1, wherein access to standard cylinder regulator is provided by means of a removable door, removeably attached to said protector housing.

7. The protector of claim 6, wherein adjustable opposing impact blocks are provided on the interior of said protector, to be wedged between the interior surface of said valve protector and on opposing sides of the exterior surface of said standard valve.

* * * * *